United States Patent
Gupta et al.

(10) Patent No.: US 9,929,466 B2
(45) Date of Patent: Mar. 27, 2018

(54) SELF-STEERING ANTENNA ARRAYS

(71) Applicant: The Regents of the University of California, Oakland, CA (US)

(72) Inventors: Arpit K. Gupta, San Diego, CA (US); James Buckwalter, San Clemente, CA (US)

(73) Assignee: The Regents of The University of California, Oakland, CA (US)

( * ) Notice: Subject to any disclaimer, the term of this patent is extended or adjusted under 35 U.S.C. 154(b) by 256 days.

(21) Appl. No.: 14/775,556

(22) PCT Filed: Mar. 13, 2014

(86) PCT No.: PCT/US2014/026688
§ 371 (c)(1),
(2) Date: Sep. 11, 2015

(87) PCT Pub. No.: WO2014/178952
PCT Pub. Date: Nov. 6, 2014

(65) Prior Publication Data
US 2016/0036125 A1 Feb. 4, 2016

Related U.S. Application Data

(60) Provisional application No. 61/780,696, filed on Mar. 13, 2013.

(51) Int. Cl.
*G01S 5/02* (2010.01)
*H01Q 3/26* (2006.01)
(Continued)

(52) U.S. Cl.
CPC ......... *H01Q 3/2652* (2013.01); *H01Q 3/2605* (2013.01); *H01Q 3/34* (2013.01); *H01Q 3/42* (2013.01); *H04W 40/06* (2013.01)

(58) Field of Classification Search
CPC ...... G01S 5/02; H01Q 3/2652; H01Q 3/2605; H01Q 3/34; H01Q 3/42; H04W 40/06
(Continued)

(56) References Cited

U.S. PATENT DOCUMENTS 3,905,009 A * 9/1975 Hughes .................. F41G 7/228
342/371
5,475,392 A * 12/1995 Newberg ............. H01Q 3/2676
342/375
(Continued)

FOREIGN PATENT DOCUMENTS

WO    WO 2007055870 A2 *  5/2007    ............. H03L 7/099

OTHER PUBLICATIONS

Alexanian et al., "Enhanced scanning range of coupled oscillator arrays utilizing frequency multipliers," Antennas and Propagation Society International Symposium, AP-S. Digest 2:1308-1310 (1995).
(Continued)

*Primary Examiner* — Harry K Liu
(74) *Attorney, Agent, or Firm* — Mintz Levin Cohn Ferris Glovsky and Popeo, P.C.

(57) ABSTRACT

Methods and apparatus, including computer program products are provided for self-steering antennas. In one aspect, there is a method. The method may include receiving, at a plurality of antennas, phase shifted versions of a signal. The method may further include determining a phase relationship between the phase shifted versions of the signal. Based on the determined phase relationship, the method may include adjusting a phase of a first local oscillator to remove a phase difference between the phase shifted versions of the signal to change the phase shifted versions of the signal to being in-phase versions of the signal. The method may
(Continued)

further include combining the in-phase versions of the signal to steer a beam to a transmitter.

17 Claims, 5 Drawing Sheets

(51) Int. Cl.
   *H04W 40/06* (2009.01)
   *H01Q 3/42* (2006.01)
   *H01Q 3/34* (2006.01)

(58) Field of Classification Search
   USPC .......................................................... 342/369
   See application file for complete search history.

(56) References Cited

U.S. PATENT DOCUMENTS

| | | | | |
|---|---|---|---|---|
| 5,933,058 | A * | 8/1999 | Pinto | H03L 7/099 327/157 |
| 6,473,362 | B1 * | 10/2002 | Gabbay | H01Q 3/26 367/119 |
| 6,549,164 | B2 | 4/2003 | Paschen et al. | |
| 7,379,515 | B2 * | 5/2008 | Johnson | H03D 7/00 375/347 |
| 7,414,577 | B2 | 8/2008 | Mohamadi | |
| 9,071,253 | B2 * | 6/2015 | Li | H03B 1/00 |
| 2008/0297414 | A1 * | 12/2008 | Krishnaswamy | H01Q 3/28 342/368 |
| 2012/0154227 | A1 * | 6/2012 | Adlerstein | H01Q 21/0006 343/703 |
| 2012/0162010 | A1 * | 6/2012 | Georgiadis | E02D 29/14 342/374 |
| 2014/0197894 | A1 * | 7/2014 | Tajalli | H03L 7/08 331/16 |
| 2014/0266866 | A1 * | 9/2014 | Swirhun | G01S 7/026 342/188 |

OTHER PUBLICATIONS

DiDomenico, L. and G. Rebeiz, "Digital communications using self-phased arrays," Microwave Symposium Digest. 2000 IEEE MTT-S International, 3:1705-1708 (2000).

Liao, P. and R. York, "A new phase-shifterless beam-scanning technique using arrays of coupled oscillators," Microwave Theory and Techniques, IEEE Transactions, 41(10):1810-1815 (1993).

Shiroma et al., "A full-duplex dual-frequency self-steering array using phase detection and phase shifting," Microwave Theory and Techniques, IEEE Transactions, 54(1):128-134 (2006).

Yan, S. and T. Chu, "A beam-steering antenna array using injection locked coupled oscillators with self-tuning of oscillator free-running frequencies," Antennas and Propagation, IEEE Transactions, 56(9):2920-2928 (2008).

York, R., "Nonlinear analysis of phase relationships in quasioptical oscillator arrays," Microwave Theory and Techniques, IEEE Transactions, 41(10):1799-1809 (1993).

* cited by examiner

SELF-STEERING ANTENNA ARRAYS

CROSS REFERENCE TO RELATED APPLICATIONS

This application is a national-phase entry of Patent Cooperation Treaty Application No. PCT/US2014/026688, entitled "Self-Steering Antenna Arrays," which has an international filing date of Mar. 13, 2014, and claims priority to U.S. Provisional Patent Application 61/780,696 filed Mar. 13, 2013, entitled "Self-Steering I/Q Receiver Array," the contents of both which are hereby incorporated by reference in their entirety.

STATEMENT OF GOVERNMENT SPONSORED SUPPORT

Certain aspects of the subject matter described herein were developed with U.S. Government support under Award No. N66001-11-C-5204 awarded by SPAWAR. The U.S. Government has certain rights in the invention.

FIELD

The subject matter disclosed herein relates to wireless communications and, in particular, transceivers using antennas arrays.

BACKGROUND

Phased array antennas provide many benefits to communications systems. For example, phased array antennas are electronically steered thereby eliminating mechanical components that wear out. Phased array antennas provide high directivity due to the multiple antenna elements and the phasing of signals sent to and received from the multiple antenna elements. Although highly directional antennas provide high gain and thus can communicate over long distances and/or at low transmit power, the transmit antenna and receive antenna must be pointing at one another. Alignment of the transmit antenna with the receive antenna can be difficult to achieve.

SUMMARY

Methods and apparatus, including computer program products are provided for self-steering antennas. In one aspect, there is a method. The method may include receiving, at a plurality of antennas, phase shifted versions of a signal. The method may further include determining a phase relationship between the phase shifted versions of the signal. Based on the determined phase relationship, the method may include adjusting a phase of a first local oscillator to remove a phase difference between the phase shifted versions of the signal to change the phase shifted versions of the signal to being in-phase versions of the signal. The method may further include combining the in-phase versions of the signal to steer a beam to a transmitter.

In some variations, one or more of the features disclosed herein including the following features can optionally be included in any feasible combination. The plurality of antennas may include at least two antennas, wherein each of the antennas is coupled to a different local oscillator. The plurality of antennas may be antenna elements of a phased array antenna. The different local oscillators may be configured as a coupled oscillator array, and the phases of the different local oscillators in the coupled oscillator array may be adjustable via tuning inputs. The adjusting may be performed via the tuning inputs, and phase locked loops may provide the signals to the tuning inputs. The phase relationship may be determined at an intermediate frequency that is lower than a radio frequency of the signal. The determining may be performed by a phase locked loop and/or the determining may comprise a coupled phase locked loop. The coupled phase locked loop may compare a down-converted and in-phase signal associated with one of the plurality of antennas to the down-converted quadrature phase signal from another of the plurality of antennas.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

Figure 1:
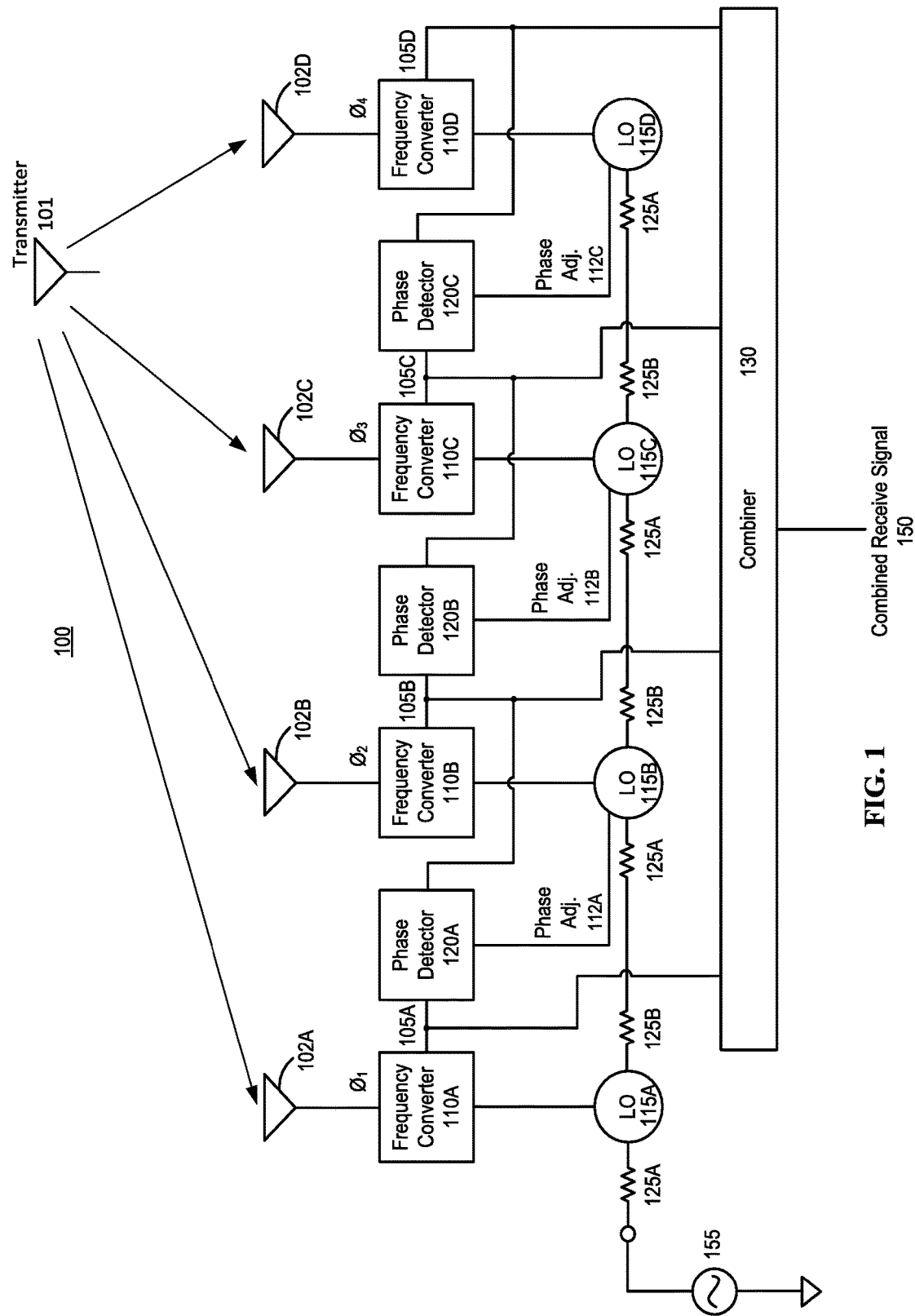
FIG. 1 depicts an example of a phased array antenna configured to self-steer a beam of the phased array antenna to a transmitter, in accordance with some example embodiments.

Like labels are used to refer to same or similar items in the drawings.

DETAILED DESCRIPTION

The antennas in many electronic devices are omnidirectional. Omnidirectional antennas generally transmit and receive electromagnetic energy in all directions. A problem with omnidirectional antennas is that they require a large amount of transmit power to achieve useful data rates at useful distances. Many electronic devices cannot provide the radio frequency transmit power that would be required or battery capacity when high transmit power is used. Directional antennas reduce the transmit power required to achieve a given data rate at a given distance, but because directional antennas are not omnidirectional, the transmit antenna and the receive antenna must be pointed toward one another. A directional transmit antenna should be pointed in the direction of the receive antenna and the receive antenna should be pointed in the direction of the transmit antenna. Both antennas should be pointed accurately enough to be within the beam widths of both antennas.

A challenge of using a directional antenna is determining where to point the antenna. Without information such as global positioning system (GPS) coordinates of both the transmit antenna and receive antenna (or other pointing information), directional antennas often resort to some type of scanning to determine the direction to the antenna at the other end of a communications link.

The subject matter herein discloses a phased array antenna that may self-steer. In some embodiments, a signal may be received at multiple antenna elements of a phased array antenna. Each of the antenna elements of the phased array may receive the transmitted signal with a different phase. The phase of the signal received at each antenna element may depend on the path length between the receive antenna element and the transmit antenna. In this way, the phases of the radio frequency signals received at the antenna elements may be shifted, In some embodiments, the phase of the signal received at each of the antenna elements may be determined. The phase determination may be relative to one or more adjacent antenna elements. For example, when an antenna element has an adjacent antenna element, the phases of the received signals from the antenna elements may be compared to produce a signal representative of the difference in phase between the two received signals. The phase difference may be used to adjust the phase of a local oscillator. In some embodiments, the antenna elements may have dedicated local oscillators for each element or a dedicated oscillator for a small group of elements. For example, two antenna elements may each have associated oscillators. The phase of one of the oscillators may be adjusted to make the difference in phase between the down-converted signals corresponding to the two oscillators zero degrees or nearly zero degrees. The phases of signals from other antenna elements may be adjusted in the same way. A result of adjusting the phases of the received signals from the antenna array elements may cause the signals to be in-phase with one another. Because the signals are in-phase, the signals may be combined constructively to provide antenna gain.

The detection of a phase difference between the signals from adjacent antenna elements and/or phase adjustment to one or both of the signals may be performed at the frequency of the transmitted/received signal or may be performed at an intermediate frequency. In some embodiments, adjacent elements may be separated by one or more elements.

FIG. 1 depicts an example of a phased array antenna 100 configured to self-steer a beam of the phased array antenna to a transmitter, in accordance with some example embodiments. A transmitter may transmit a signal that is received by multiple antenna elements of the phased array. The elements may have associated with them a frequency converter, a local oscillator, and a phase detector. In some embodiments, the local oscillators may be configured as a coupled oscillator array (COA). In some embodiments, the phase detector may determine a phase difference between a down-converted version of a signal received at one antenna element compared to a down-converted version of the signal received at another element. In this way, the phase detector operates at an intermediate frequency (IF). In some embodiments, the phase detector may determine the phase difference at the radio frequency of the transmitted signal instead of at an intermediate frequency. The phase detector may generate a signal to adjust the phase of the local oscillator associated with one of the antenna elements so that the signals from the two antenna elements are in-phase with one another. The in-phase signals may then be combined to provide antenna gain.

Transmitter 101 may transmit a signal that is received by antenna elements 102A-D. The phases of the received signals may differ due to path length differences from the transmitter 101 to each antenna element 102A-D, or due to other factors. For example, transmit antenna 101 may be in the far-field (for example, tens of wavelengths away or more) of receive phased array 100, and receive phased array 100 may be in the far-field of transmit antenna 101. In some embodiments, phased array 100 may be a planar array oriented so that the signal from transmitter 101 arrives at an angle $\psi$ from a normal to the planar array. The path length difference between adjacent antenna elements due to the transmitter being at angle may be represented as: $d \sin(\psi)$, where d is the spacing between the antenna elements. The path length translates to a phase shift between the signals received at the two antenna elements.

Antenna element 102A receives the signal $\varphi_1$ from transmitter 101 which has a particular phase angle due to the path length between antenna element 102A and transmitter 101. The received signal $\varphi_1$ is down-converted by frequency converter 110A and local oscillator 115A to produce down-converted signal 105A. Frequency converter 110A may be a mixer or any other type of frequency converter. The received signals $\varphi_2$, $\varphi_3$, and $\varphi_4$ may be down-converted by frequency converters 110B-D and local oscillators 115B-D to produce down-converted signal 105B-D. The down-converted signals 105A-D may be combined together by combiner 130 to produce a stronger signal. The combining process to produce a stronger signal may be referred to as antenna gain. Although four signals 105A-D from four antenna elements 102A-D are shown in FIG. 1, any other number of elements can be used as well.

Antenna elements 102A-D may be patches of a planar array, patches of a conformal array, wire antennas, aperture antennas, slot antennas, travelling wave antennas, reflector antennas, or any other type of antenna.

In some embodiments, local oscillators 115A-D are coupled oscillators and may be referred to as a coupled oscillator array. Oscillators 115A-D may be coupled together through couplers 125A and 125B between oscillators 115A-D. Couplers 125A-B allow some energy from one oscillator to couple to one or more other oscillators. The coupled oscillators in FIG. 1 are in an array where each oscillator is coupled to its nearest neighbor oscillator(s). Other configurations and couplings between oscillators may also be used. In some embodiments, the couplings between oscillators may cause the frequency of the oscillators to drift to a common frequency. For example, local oscillator 115A may be coupled to a stable reference frequency source 155 that does not drift in frequency. The coupling between stable frequency source 155 and local oscillator 115A may cause local oscillator 115A to drift to the same frequency as stable source 155. The coupling between local oscillators 115A and 115B may cause local oscillator 115B to drift to the same frequency as local oscillator 115A. The coupling between oscillators 115B and 115C may cause oscillator 115C to drift to the same frequency as oscillator 115B, and so on. In this way, the frequency of oscillators 115A-D may be locked together and locked to stable frequency reference 155. Although FIG. 1 depicts four oscillators, any other number of oscillators may be used as well. Although FIG. 1 depicts a particular arrangement of oscillator couplings, other coupling arrangements may be used as well. For example, the reference oscillator may be injected at the center of a series of oscillators. In another example, the oscillators may be coupled together in a star or other arrangement.

Phase detector 120A compares the phase of down-converted signal 105A to down-converted signal 105B and generates a phase adjustment signal 112A representative of the phase difference between down-converted signal 105A and down-converted signal 105B. Local oscillator 115B may have a tuning input to adjust the oscillator. Because oscillator 115B is locked in frequency to local oscillators 115A and 115C, the tuning input may act to adjust the phase of local oscillator 115B instead of the frequency of oscillator 115B. The phase adjustment signal 112A may be configured to cause the phase of local oscillator 115B to shift such that the phase difference between 105A and 105B tends to be reduced. In some embodiments, phase adjustment signal 112A, which is representative of the phase difference between the signals received at antenna 102A and 102B, may cause a shift in the phase of local oscillator 115B that tends to drive the phase difference between 105A and 105B to zero or near zero degrees (in phase). Thus down-converted signal 105B may be driven to be in-phase or in alignment with the down-converted signal 105A. Phase detector 120B may compare the phase of down-converted signal 105B to down-converted signal 105C and may generate phase adjustment signal 112B that may drive the phase difference between down-converted signal 105B and 105C toward zero via phase adjustment to oscillator 115C. Phase detector 120C may compare the phase of down-converted signal 105C to down-converted signal 105D, and generate phase adjustment signal 112C that drives the phase difference between down-converted signal 105C and 105D toward zero via phase adjustment to oscillator 115D. In this way, down-converted signals 105A-D may be placed in-phase with one another allowing for signals 105A-D to be constructively combined by combiner 130 to produce combined receive signal 150.

In some embodiments, frequency converters 110A-D and/or local oscillators 115A-D and/or phase detectors 120A-C and/or combiner 130 may be implemented using discrete components, or may be implemented digitally, in an application specific integrated circuit (ASIC), in a field-programmable gate array (FPGA), or in executable program code performed by at least one processor. Phase detector 120A may be implemented as a phase locked loop, or any other type of phase detecting device, circuit, or executable code.

Figure 2:
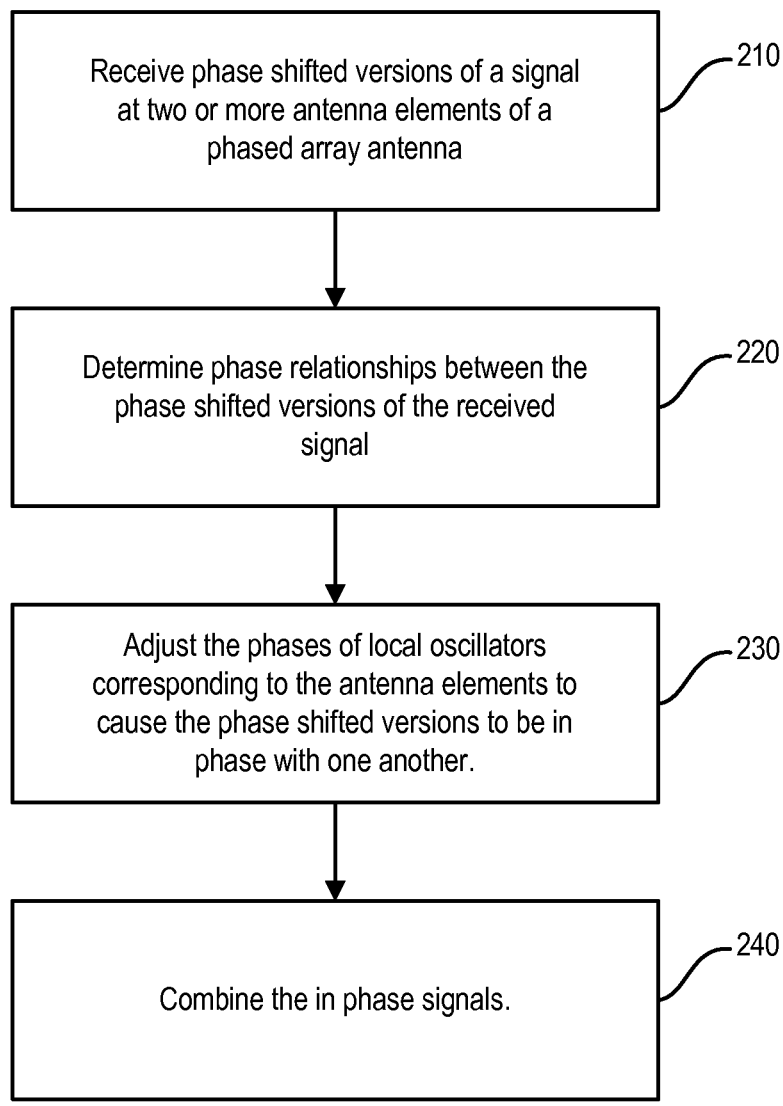
FIG. 2 depicts process for adjusting a phase difference between antenna elements to allow the signals from the antenna elements to be combined constructively, in accordance with some example embodiments.

FIG. 2 depicts a process for adjusting phase differences between signals from antenna elements of a phased array to allow the signals form the antenna elements to be combined constructively, in accordance with some example embodiments. At 210, two or more antennal elements may receive a signal from a transmitter. Each antenna element may receive a phase shifted version of the transmitted signal. At 220, a phase relationship between the signals from the antenna elements may be determined. At 230, the phases of the received signals may be shifted by adjusting the phases of local oscillators resulting in the phases of the received signals being shifted to be in-phase with one another. At 240, the phase shifted receive signals may be combined constructively. The description of FIG. 2 also refers to FIG. 1.

At 210, two or more antennal elements may receive signals from a transmitter, in accordance with some example embodiments. For example, a transmitter such as transmitter 101 may transmit a signal that is received at antenna elements 102A-D. The signal received at each antenna element may be a phase shifted version of the transmitted signal. The difference in phase may be due to a path length difference between the antenna elements and the transmitter, path length differences in the circuits associated with the antenna elements, or differences in the components associated with each antenna element.

At 220, a phase relationship between the received signals may be determined, in accordance with some example embodiments. For example, the phase of a down-converted signal such as down-converted signal 105A may be compared by a phase detector such as phase detector 120A to the phase of another down-converted signal such as 105B. The phase detector may be a phased locked loop or any other type of phase detector or phase comparator. The phase of 105B may be compared to signal 105C by phase detector 120B, and so on.

At 230, the phases of the received signals may be shifted by adjusting the phases of local oscillators associated with the received signals, in accordance with some example embodiments. By adjusting the phases of the local oscillators, such as local oscillators 115A-D, the phases of signals, such as down-converted signals 105A-D, may also be adjusted. The adjustment may be performed to cause signals 105A-D to be in-phase with one another. The phases of local oscillators 115A-D may be adjusted via a tuning input to oscillators 115A-D. In some embodiments, local oscillators 115A-D may be coupled oscillators. In some embodiments, the tuning input to oscillators 115A-D may be a frequency tuning input, but because the coupled oscillators are locked together in frequency, the tuning input may adjust the phase of the local oscillator output rather than the frequency. Phase adjustment signals 112A-C from phase detectors 120A-C respectively, may cause the phases of down-converted signals 105A-D to be in-phase despite differing phases at antenna elements 102A-D.

At 240, the phase adjusted receive signals are combined constructively, in accordance with some example embodiments. For example, a combiner, such as combiner 130, may constructively combine the down-converted signals 105A-D. Down-converted signals 105A-D may be combined by analog hardware or may be combined digitally when signals 105A-D are represented digitally. Analog representations of a signal, such as signals 105A-F, may be converted to digital signals with the use of analog-to-digital converters.

In some embodiments, the process of FIG. 2 may be used by a first receiver using a phased array to determine the direction to a first transmitter. The determined direction may then be provided to a second phased array or other antenna in order to allow the second array/other antenna to also point in the direction of the first transmitter. In some embodiments, a second receiver may be collocated with the first transmitter. The same or nearly the same direction may be used to direct a second transmitter collocated with the first receiver toward the second receiver. In this way, the direction information determined by the process of FIG. 2 may be shared with and used by other communications equipment.

Figure 3:
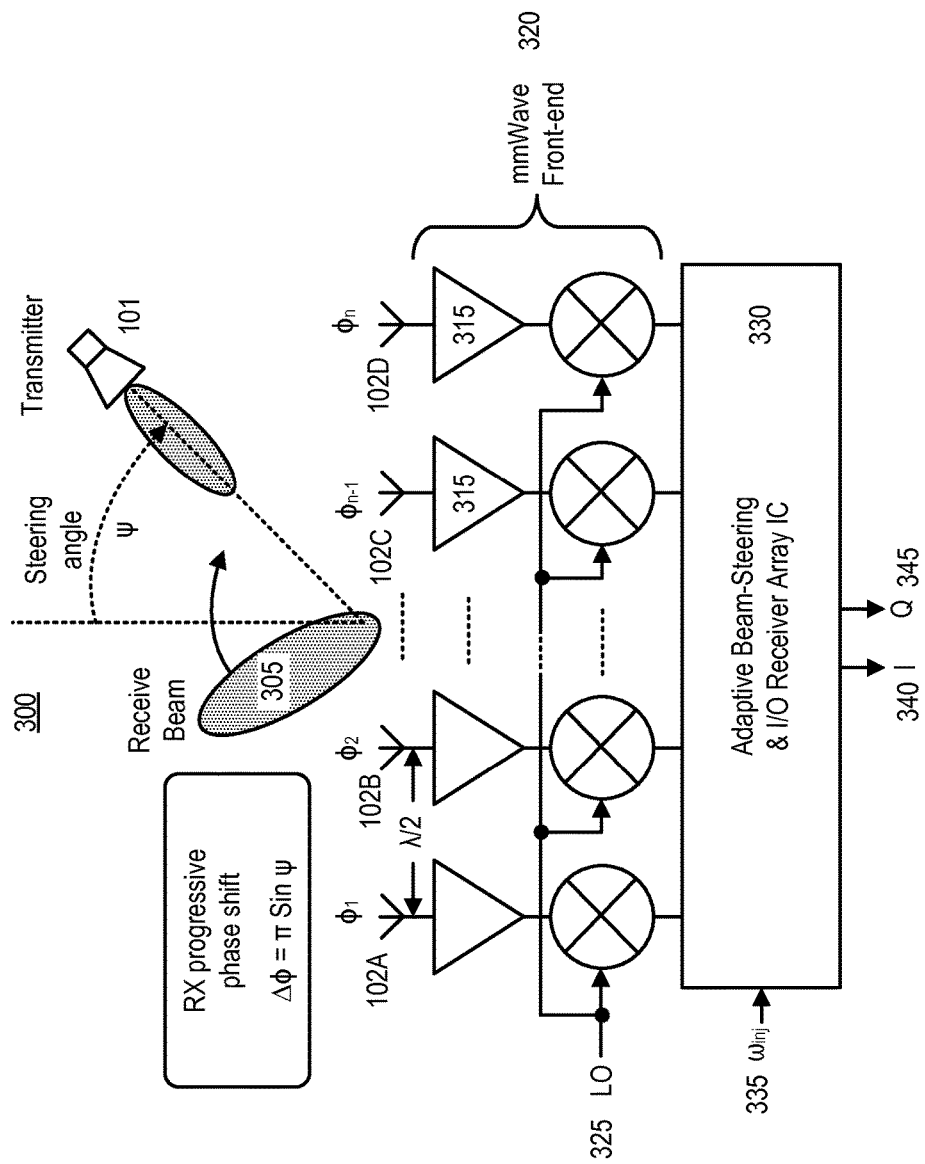
FIG. 3 depicts an example of a self-steering phased array antenna configured to receive, in accordance with some example embodiments.

FIG. 3 depicts an example of a self-steering phased array antenna configured to receive, in accordance with some example embodiments. The description of FIG. 3 also refers to FIGS. 1 and 2. Millimeterwave front-end 320 may amplify and down-convert signals received at antenna elements 102A-D. The down-converted signals may be fed to adaptive beam steering integrated circuit 330 which in turn forms a receive beam in the direction of transmitter 101. In some embodiments, the adaptive beam steering circuit 330 may provide a maximum receiver signal-to-noise ratio (SNR) independent of the direction of the incident signal. In some embodiments, the adaptive beam steering integrated circuit 330 may steer receive beam 305 over a range of steering angle $\psi$ of ($\pm$) 90 degrees.

A progressive phase shift Δφ between neighboring antenna elements may form a beam toward a signal incident from an angle ψ as shown in FIG. 3. For example, the phase difference between the signals from antenna elements 102A and 102B may be Δφ, and the additional phase shift between the signals from antenna elements 102B and 102C may also be Δφ. When the distance between the antenna elements is λ/2 (one half-wavelength at the transmitted frequency), the phase shift due to the path length difference between the transmitter and two adjacent antenna elements may be represented as Δφ=π sin(ψ), where ψ is the angle between the transmitter and the normal to the antenna elements as shown in FIG. 3. In some embodiments, the progressive phase shift, Δφ, across the antenna elements may be removed by changing the phases of the local oscillators (LOs) in a coupled oscillator array (COA) at 330. In some embodiments, the signals from antenna elements 102A-D may first be down-converted by a local oscillator 320 to an intermediate frequency. A coupled oscillator array and phase detector as described herein may then provide self-steering. In some embodiments, to adaptively form a beam in a predetermined direction, a coupled phase-locked loop (CPLL) may determine the phase difference between two antenna elements and generate a signal to adjust the phase of the oscillators in the coupled oscillator array at 330. In some embodiments, the coupled oscillator array and the coupled-phased locked loop may cause the antenna elements producing receive beam 305 to steer to the direction of transmitter 101.

In some embodiments, a coupled oscillator array may include weakly coupled-oscillators with coupling coefficient ϵ. The $i^{th}$ oscillator may have phase, natural frequency, and quality factor of $\theta_i$, $w_i$ and Q, respectively. In some embodiments, k may represent the phase constant, and d the antenna spacing. For λ/2 antenna spacing, kd=π. In some embodiments, when the natural frequency of the oscillators is detuned (e.g. $w_i \neq w_{i-1}$) within a frequency locking range, the oscillators may lock to the same frequency but with a phase difference. In some embodiments, the maximum phase difference, AO, may be approximately ±90 degrees, which may correspond to a steering angle range of ±30 degrees. In some embodiments, a frequency multiplier may improve the steering angle range. For example, a frequency multiplication M may increase the phase difference, Δφ, and thus the maximum steering angle. In some embodiments, Δφ may be extended to approximately ±180 degrees using a frequency doubler (M=2) which may result in an increased steering angle range, ψ, to approximately ±90 degrees.

In some embodiments, a progressive phase shift may be generated in a coupled oscillator array by setting the natural frequency of interior oscillators to approximately the same frequency ($\omega_i = \omega_o$) and detuning the outer oscillators. For example, instead of injecting frequency reference 155 in FIG. 1 at coupled oscillator 115A, the reference may be injected between the coupling of coupled oscillators 115B and 115C. Precise control of $\omega_i$ may be complicated by circuit mismatches. In some embodiments, coupled oscillator arrays for antennas may produce a phase progression from −20 degrees to +50 degrees (or steering angles from about −6.5 degrees to +16 degrees). Larger steering ranges are also possible.

Figure 4:
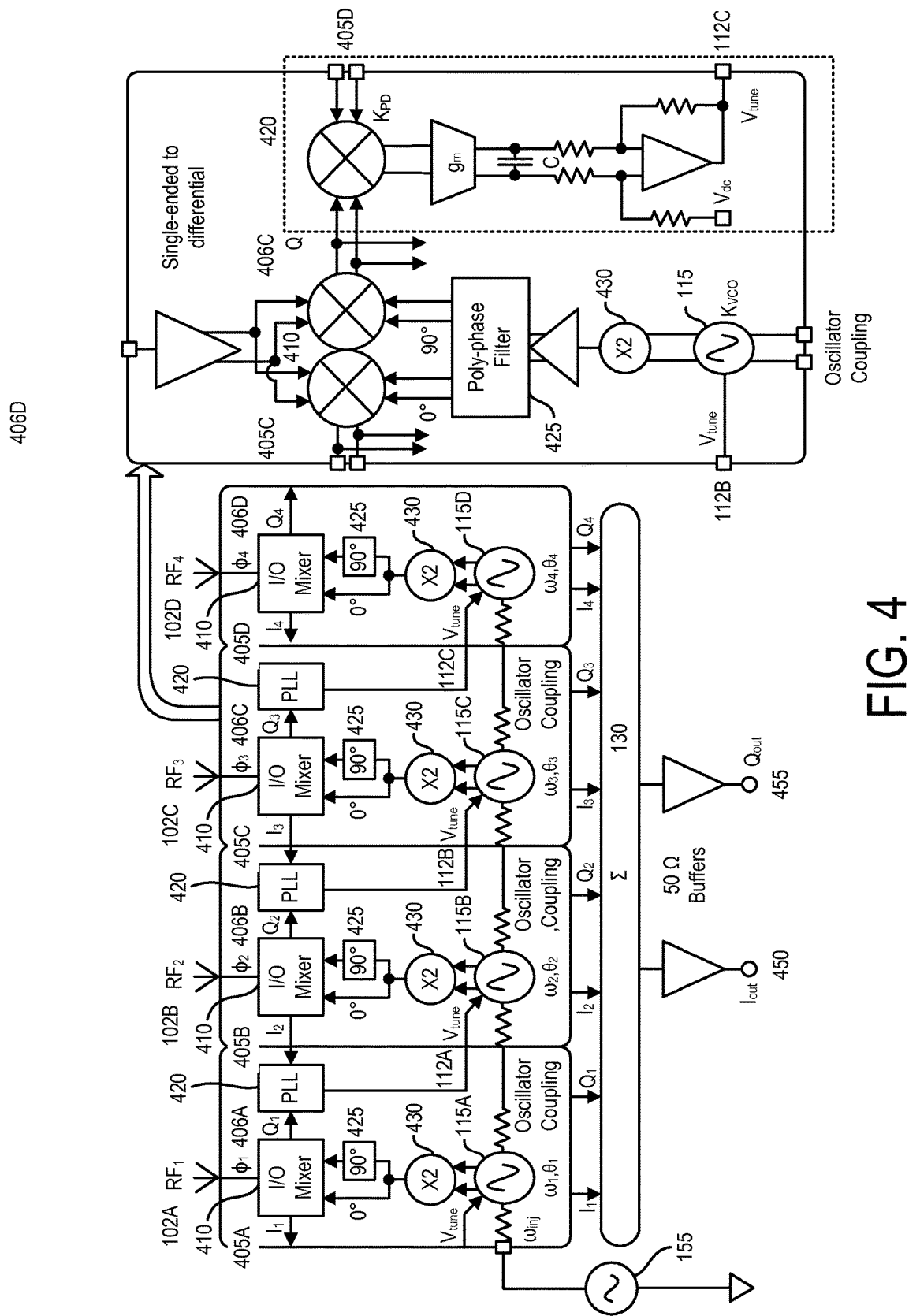
FIG. 4 depicts another example of a self-steering phased array antenna configured to receive, in accordance with some example embodiments.

FIG. 4 depicts another example of a self-steering phased array antenna configured to receive, in accordance with some example embodiments. The description of FIG. 4 also refers to FIGS. 1, 2, and 3. The example in FIG. 4 includes a coupled oscillator array (COA) and coupled phase locked loop (CPLL) for oscillator phase control. In some embodiments, the phase dynamics of each oscillator in the presence of the coupled oscillator array and the coupled phase locked loop may be described by EQN. 1 where i=2, 3. A and $\omega_o$ may represent the oscillator amplitude and natural frequency, respectively. $K_{vco}$ may be the oscillator tuning coefficient, $K_{pd}$ may be the phase detector gain, and f(t) may be the impulse response of the loop filter (integrator) and may be equal to $$f(t) = \frac{9}{C}\frac{m}{C}U(T)$$

where U(t) is the unit step function. The 90-degree excess phase shift in the (i−1)th oscillator may be added to lock each oscillator in phase since the loop may force the phase difference between the input signals of the phase detector to be 90 degrees independent of the phase difference between the incident signals. Under steady-state conditions, the dynamics may produce VPD, i=0 and $$\frac{d\theta i}{dt} = \omega_{inj}.$$

EQN. 1 is as follows:

$$\frac{d\theta_1}{dt} = \omega_{o,1} + \frac{\epsilon\omega_{o,1}}{2Q}\left[\frac{A_{inj}}{A}\sin(\theta_{inj} - \theta_1) + \sin(\theta_2 - \theta_1)\right]$$

$$\frac{d\theta_i}{dt} = \omega_{o,i} + \frac{\epsilon\omega_{o,i}}{2Q}[\sin(\theta_{i-1} - \theta_i) + \sin(\theta_{i+1} - \theta_i)] +$$
$$2K_{vco}K_{pd}\cos\{(2\theta_{i-1} - \phi_{i-1} + 90°) -$$
$$(2\theta_i - \phi_i)\} * f(t)$$

$$\frac{d\theta_4}{dt} = \omega_{o,4} + \frac{\epsilon\omega_{o,4}}{2Q}[\sin(\theta_3 - \theta_4)] + 2K_{vco}K_{pd}\cos\{(2\theta_{3-1} -$$
$$\phi_3 + 90°) - (2\theta_4 - \phi_4)\} * f(t)$$

In some embodiments, when the phase detector is driven by the quadrature (Q) and in-phase (I) signals of the neighboring receive paths, the steady-state phase shift between neighboring oscillators may be given by EQN. 2, which is as follows:

$$2\Delta\theta = \Delta\varphi, \quad \text{EQN. 2}$$

where the factor of two arises from the use of a frequency doubler (M=2). In this way, the CPLL may produce a progressive phase shift across the phased array aperture. From EQN. 2, a stable phase difference of about ±90 degrees between coupled oscillators may produce about ±180 degrees of progressive phase shift. When the antenna spacing is about λ/2, the corresponding steering angle across the aperture may be about ±90 degrees.

To adaptively steer the array of antenna elements and maximize the signal-to-noise-ratio, a coupled phase locked loop (CPLL) may be used to set the frequency and phase of each coupled oscillator. For example, the phase of oscillator 115B may be adjusted according to the comparison of phase between signal 105A and signal 105B. In some embodiments, the oscillators may remain locked together through the coupling between oscillators such as coupling 125A and 125B. The coupled phase locked loop may provide a phase adjustment signal to adjust the phase of one of the oscillators such as oscillator 115B so that the signals 105A and 105B are in-phase.

The coupled phase locked loop (CPLL) may cause a receive beam such as receive beam 305 to steer toward a transmitter such as transmitter 101. In some embodiments, the array may produce a ±100° linear phase range corresponding to a ±35° steering range for half-wavelength antenna spacing. In some embodiments, the steered beam may produce an 18 dB improvement in rejection at the array nulls (±90°) compared to no adaptive beam steering.

The four oscillators 115A-D in FIG. 4 may be inductor-capacitor (LC tank) oscillators arranged with resistive coupling to each oscillator's nearest neighbor(s). In some embodiments, the resistive coupling may be implemented as an N-type metal-oxide-semiconductor (NMOS) biased in the triode region which may allow the coupling strength to be varied from about $\epsilon=0.1$ to about 0.5. The oscillator natural frequency may be any practical frequency. For example, the natural frequency may be designed to be 5 GHz or half the RF frequency at 10 GHz when a doubler is used. NMOS varactors may be used in the LC tank as the tuning elements. In some embodiments, the oscillator tuning range may be from 4.25 GHz to 5.4 GHz allowing reception of RF signals between 8.5 GHz and 10.8 GHz when a doubler is used. The doubler may be loaded by a parallel LC tank with resonant at twice the oscillator center frequency. The bandpass behavior of the LC tank may filter higher order harmonics generated in the doubler. The doubler output may be amplified and a single stage poly-phase filter may generate differential I/Q phases of the mixer/local oscillator (LO). Any other frequency and bandwidth may also be used.

At the front-end, an active balun and the like may be used to convert the single-ended radio frequency (RF) signal to a differential signal. Gilbert-cell mixers 410 may be used to down-convert the signal from the RF band of the antenna elements to the intermediate frequency band of signals 405A-D and 406A-D. Gilbert-cell mixers may exhibit low loss and low noise figure. To reduce the effect of parasitic capacitance and routing losses, a low intermediate frequency (IF) may be chosen to be 100 MHz, for example. The CPLL may consist of a Gilbert-cell mixer as phase detector, gm-C integrator, and op-amp in feedback as the summer. The phase detector may be driven by the down-converted in-phase and quadrature IF signals of neighboring elements. In some embodiments, off-chip 10 nF capacitors may be used for the gm-C integrator at 420 to improve the loop stability. A common-mode feedback circuit may set the output DC voltages at the integrator nodes at 420. A conventional RC-compensated two-stage op-amp in resistive feedback may act as the voltage summer at 420. The op-amp unity gain bandwidth (BW) may be designed to be higher than the phase locked loop (PLL) loop bandwidth which may be about 500 KHz in some embodiments. The in-phase and quadrature down-converted IF signals from each antenna element may be combined using two separate combiners, one for the in-phase components 405A-D and one for the quadrature components 406A-D. The combined IF signals may be buffered and may be passed to a detector to complete the reception process and determine the received data.

In some embodiments, a chip may be fabricated in a process such as a 45 nm complementary metal-oxide-semiconductor (CMOS) silicon-on-insulator (SOI) process. In some embodiments, the chip may occupy 3.45 sq. mm of area and may consume about 140 mW of DC power. In some embodiments, an RF input at X-band (e.g. 8-12 GHz) may be used. In some embodiments, instead of 102A-D coming directly from antenna elements, 102A-D may be connected to signals that have been down-converted from a higher frequency. For example, signals from millimeterwave antenna elements may be down-converted to lower frequency signals, and those lower frequency signals may be connected to 102A-D to provide self-steering. In some embodiments, the reference frequency 155, 355 may be 4 GHz which when doubled by a doubler such as doubler 430 produces an oscillator frequency of approximately 8 GHz. In some embodiments, a 3-dB intermediate frequency bandwidth at 405A-D and 406A-D may be 240 MHz although any other bandwidth may be used as well. In some embodiments, a demodulator may be implemented that demodulates a modulated signal carried by in-phase signal 450 and quadrature signal 455. For example, a 64-state quadrature amplitude modulation (64-QAM) signal operating at 10 megabits per second (Mbps) may be received by antenna elements 102A-D and carried by 450 and 455. In some embodiments, an error vector magnitude of less than 4% may be achieved. Any other modulation and data rate may also be used.

Figure 5:
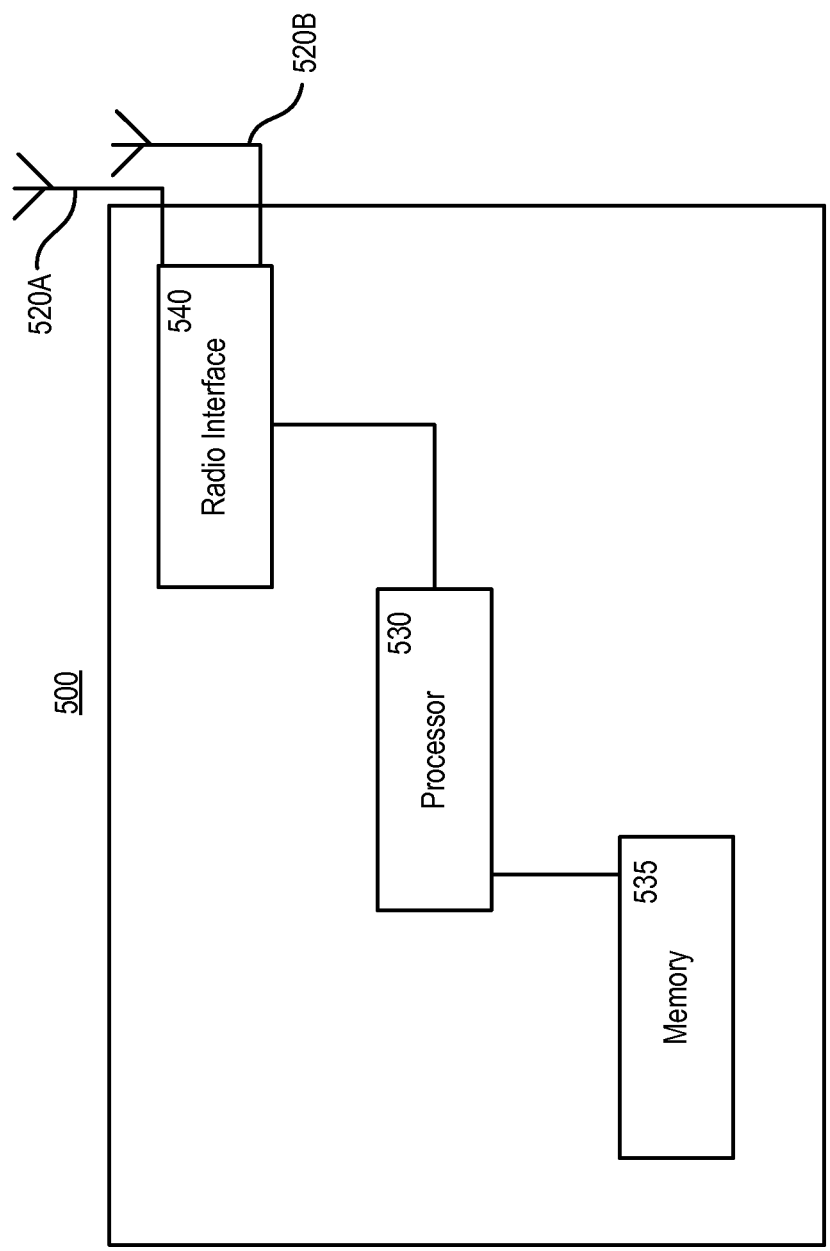
FIG. 5 depicts a radio transceiver, in accordance with some example embodiments.

FIG. 5 depicts a radio transceiver 500, in accordance with some example embodiments. For example, radio transceiver 500 may embody the process described in FIG. 2 and/or may include one or more of the embodiments depicted in FIGS. 1, 3, and 4. The radio transceiver 500 may include one or more antennas, such as antennas 520A-B (or 102A-D in FIGS. 1, 3, and 4) for receiving a downlink and transmitting via an uplink. The radio 500 may also include a radio interface 540 (also referred to as a transceiver) coupled to the antennas 520A-B. The radio interface 540 may include other components, such as filters, converters (for example, digital-to-analog converters and the like), symbol demappers, signal shaping components, an Inverse Fast Fourier Transform (IFFT) module, coders, decoders, the like, to process symbols carried by a downlink or an uplink. The radio 500 may further include at least one processor, such as processor 530 for controlling radio 500 and for accessing and executing program code stored in memory 535. In some example embodiments, the memory 535 includes code, which when executed by at least one processor causes one or more of the operations described herein. In some example embodiments, the radio 500 may comprise a mobile station, a mobile unit, a subscriber station, a wireless terminal, a tablet, a smart phone, a base station, a wireless access point, and/or any other type of wireless device.

The subject matter described herein may be embodied in systems, apparatus, methods, and/or articles depending on the desired configuration. For example, the radio transceiver and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/ machine language. As used herein, the term "machine-readable medium" refers to any computer program product, computer-readable medium, computer-readable storage medium, apparatus and/or device (e.g., magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims. Furthermore, the specific values provided in the foregoing are merely examples and may vary in some implementations.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
   receiving, at first antenna and a second antenna, phase shifted versions of a signal;
   determining, by a first phase detector coupled with the first antenna and a second phase detector coupled with the second antenna, a phase relationship between the phase shifted versions of the signal;
   adjusting, based on the determined phase relationship, a phase of a first local oscillator coupled with the first antenna and a phase of a second local oscillator coupled with the second antenna, the adjustment removing a phase difference between the phase shifted versions of the signal to change the phase shifted versions of the signal to being in-phase versions of the signal; and
   combining the in-phase versions of the signal to steer a beam to a transmitter.

2. The method of claim 1, wherein the first local oscillator and the second local oscillator are configured as a coupled oscillator array, and wherein the phases of the first local oscillator and the second local oscillator in the coupled oscillator array are adjustable via tuning inputs.

3. The method of claim 2, wherein the adjusting is performed via the tuning inputs, and wherein signals carried to the tuning input are provided by phase locked loops.

4. The method of claim 1, wherein the first antenna and the second antenna are elements of a phased array antenna.

5. The method of claim 1, wherein the phase relationship is determined at an intermediate frequency that is lower than a radio frequency of the signal.

6. The method of claim 1, wherein the determining is performed by a phase locked loop comprising the first phase detector and/or the second phase detector.

7. The method of claim 1, wherein the determining is performed by at least a coupled phase locked loop comprising the first phase detector and/or the second phase detector, wherein the coupled phase locked loop compares a down-converted and in-phase signal associated with one of the of first antenna and the second antenna to the down-converted quadrature phase signal from another of the first antenna and the second antenna.

8. An apparatus comprising:
   a receiver comprising a first antenna and a second antenna, the receiver configured to receive phase shifted versions of a signal;
   a determiner comprising a first phase detector coupled with the first antenna and a second phase detector coupled with the second antenna, the determiner configured to determine a phase relationship between the phase shifted versions of the signal;
   an adjuster configured to adjust, based on the determined phase relationship, a phase of a first local oscillator coupled with the first antenna and a second local oscillator coupled with the second antenna, the adjustment removing a phase difference between the phase shifted
   versions of the signal to change the phase shifted versions of the signal to being in-phase versions of the signal; and
   a combiner configured to combine the in-phase versions of the signal to steer a beam to a transmitter.

9. The apparatus of claim 8, wherein the adjuster comprises a phase adjustment signal from a phase detector applied to a phase adjustment input to the first local oscillator and/or the second local oscillator.

10. The apparatus of claim 8, wherein the combiner comprises at least one of a radio frequency power combiner or a digital combiner.

11. The apparatus of claim 8, wherein the first local oscillator and the second local oscillator are configured as a coupled oscillator array, and wherein phases of the first local oscillator and the second local oscillator in the coupled oscillator array are adjustable via tuning inputs.

12. The apparatus of claim 11, wherein the adjuster adjusts the phases of the first local oscillator and the second local oscillator via the tuning inputs, and wherein signals carried to the tuning input are provided by phase locked loops.

13. The apparatus of claim 8, wherein the first antenna and the second antenna are elements of a phase array antenna.

14. The apparatus of claim 8, wherein the phase relationship is determined at an intermediate frequency that is lower than a radio frequency of the signal.

15. The apparatus of claim 8, wherein the first phase detector and/or the second phase detector comprise a phase locked loop.

16. The apparatus of claim 8, wherein the first phase detector and/or the second phase detector comprise a coupled phase locked loop, wherein the coupled phase locked loop compares a down-converted and in-phase signal associated with one of the first antenna and the second antenna to the down-converted quadrature phase signal from another of the first antenna and the second antenna.

17. A non-transitory computer-readable medium encoded with instructions that, when executed by at least one processor, perform operations comprising:
- receiving, at first antenna and a second antenna, phase shifted versions of a signal;
- determining, by a first phase detector coupled with the first antenna and a second phase detector coupled with the second antenna, a phase relationship between the phase shifted versions of the signal;
- adjusting, based on the determined phase relationship, a phase of a first local oscillator coupled with the first antenna and a phase of a second local oscillator coupled with the second antenna, the adjustment removing a phase difference between the phase shifted versions of the signal to change the phase shifted versions of the signal to being in-phase versions of the signal; and
- combining the in-phase versions of the signal to steer a beam to a transmitter.

\* \* \* \* \*